United States Patent
Ichida et al.

(10) Patent No.: US 6,972,094 B2
(45) Date of Patent: Dec. 6, 2005

(54) METHOD OF RECOVERING FLUOROCHEMICAL SURFACTANT

(75) Inventors: Takuya Ichida, Settsu (JP); Masahiro Kondo, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 232 days.

(21) Appl. No.: 10/343,785

(22) PCT Filed: Aug. 8, 2001

(86) PCT No.: PCT/JP01/06799

§ 371 (c)(1),
(2), (4) Date: Mar. 24, 2003

(87) PCT Pub. No.: WO02/13953

PCT Pub. Date: Feb. 21, 2002

(65) Prior Publication Data

US 2003/0168405 A1    Sep. 11, 2003

(30) Foreign Application Priority Data

Aug. 11, 2000 (JP) ............................. 2000-244369

(51) Int. Cl.⁷ ............................................. B01D 61/02

(52) U.S. Cl. .................... 210/652; 210/654; 562/605; 570/177

(58) Field of Search ................................ 210/651–653, 210/770, 774, 805, 806, 644, 650; 562/605; 570/117, 238, 239, 262, 264

(56) References Cited

U.S. PATENT DOCUMENTS

| | | | |
|---|---|---|---|
| 2,559,752 A | | 7/1951 | Berry et al. |
| 4,369,266 A | | 1/1983 | Kuhls et al. |
| 4,609,497 A | * | 9/1986 | Cope .......................... 554/103 |
| 4,623,487 A | * | 11/1986 | Cope .......................... 554/185 |
| 4,639,337 A | * | 1/1987 | Cope et al. ................. 554/178 |

FOREIGN PATENT DOCUMENTS

| | | |
|---|---|---|
| EP | 0 460 284 | 12/1991 |
| EP | 0 969 022 A1 | 1/2000 |
| EP | 1 097 948 A1 | 5/2001 |
| JP | 51-37973 | 3/1976 |
| JP | 01-117840 | 5/1989 |
| JP | 06-025072 | 2/1994 |
| JP | 07-053465 | 2/1995 |
| JP | 8-20611 A | 1/1996 |
| JP | 08/253439 | 10/1996 |
| WO | WO 99/50319 A1 | 10/1999 |

* cited by examiner

*Primary Examiner*—Joseph Drodge
(74) *Attorney, Agent, or Firm*—Birch, Stewart, Kolasch & Birch, LLP

(57) ABSTRACT

Upon recovering a fluorochemical surfactant from a fluorochemical-containing aqueous solution, there is provided a method for recovering the fluorochemical surfactant from the aqueous solution containing the surfactant. In the method, the fluorochemical surfactant is recovered by subjecting the aqueous solution containing the fluorochemical surfactant to a filtration treatment step with a reverse osmosis membrane so as to obtain from the aqueous solution, a concentrated aqueous solution in which the concentration of the fluorochemical surfactant is increased.

16 Claims, 2 Drawing Sheets

US 6,972,094 B2

METHOD OF RECOVERING FLUOROCHEMICAL SURFACTANT

This application is the national phase under 35 U.S.C. § 371 of PCT International Application No. PCT/JP01/06799 which has an International filing date of Aug. 8, 2001, which designated the United States of America.

TECHNICAL FIELD

The present invention relates to recovering a fluorochemical surfactant, and particularly to recovering a fluorochemical (or fluorine-containing) surfactant used as, for example an emulsifier, by means of a filtration treatment with a reverse osmosis membrane.

BACKGROUND ART

A fluorochemical surfactant (for example, $C_7F_{15}COONH_4$ or the like) is generally used as an emulsifier in a process for producing a fluoropolymer (such as fluororubber, fluororesin and so on) wherein a fluoromonomer (such as tetrafluoroethylene (TFE), vinylidenefluoride (VdF) and so on) is homopolymerized or copolymerized. It is desired that these fluorochemical surfactants are recovered, considering that these surfactant affect the environment and generally require a high cost.

The steps of the process for producing such fluoropolymer are schematically shown in FIG. 2. Emulsion polymerization of a fluoromonomer is conducted in a polymerization step 1, and then, in a coagulation step 3, the fluoropolymer particles which results from the polymerization are flocculated by adding a salt or an acid, and the flocculated fluoropolymer is separated and removed from the effluent from the polymerization step while the remaining liquid which is a discharged liquid after coagulation is obtained as an aqueous solution A. This discharged liquid A after coagulation is an aqueous solution containing the fluorochemical surfactant, and may additionally contain a component which is inevitably immixed into the solution. Such component is, for example, the fluoropolymer particles which cannot be separated. Further, after the coagulation step 3, the flocculated fluoropolymer obtained by separation may be washed with water or an aqueous medium as a washing liquid. The used washing liquid as a discharged liquid resulting from separation and removal of the fluoropolymer (namely the discharged washing liquid) is also an aqueous solution containing the fluorochemical surfactant, that is, the aqueous solution A1'. In another embodiment, after the coagulation step 3, in the dehydration step 4, the flocculated fluoropolymer obtained by separation is dehydrated mechanically to obtain a dehydrated flocculated fluoropolymer while an aqueous solution A2' as a discharged liquid resulting from dehydration which contains the fluorochemical surfactant is produced. Further, if necessary, the dehydrated flocculated fluoropolymer may be washed with water or an aqueous medium as a washing liquid. In that case, the used washing liquid as a discharged liquid resulting from separation and removal of the fluoropolymer (namely the discharged washing liquid) is also an aqueous solution which contains the fluorochemical surfactant (which is indicated as A3' in FIG. 2)

In any process, the flocculated fluoropolymer which is separated and removed in the coagulation step 3 and the dehydration step 4 is delivered to a drying step 9 in which the remained moisture is removed by heating and the fluoropolymer is obtained as a powder product. At this stage, the discharged gas from the drying step 9 contains, in addition to steam, a vaporized fluorochemical surfactant which has been entrained by the flocculated fluoropolymer. By washing the discharged gas with a washing liquid such as water or an adequate alkaline aqueous solution, a washing liquid which contains the fluorochemical surfactant (an aqueous solution B) is produced.

Further, when the fluoropolymer is a meltable fluoropolymer, the dried fluoropolymer is thermally treated to be shaped into a final pellet form in a thermal treatment step 35. In this treatment step 35, the fluorochemical surfactant which has been entrained by the dried fluoropolymer is heated to be vaporized and is exhausted together with a discharged gas resulting from this thermal treatment step. By washing the discharged gas with a washing liquid such as water or an adequate alkaline aqueous solution, the washing liquid which contains the fluorochemical surfactant (an aqueous solution C) is produced.

The fluorochemical surfactant is usually supplied to the polymerization step in a form of salt (particularly ammonium salt). However, at least part of salt is transformed into an acid form depending on the conditions of the polymerization step and the following steps. Therefore, all the above-mentioned aqueous solutions containing the surfactant include the fluorochemical surfactant in both forms of salt and acid. Generally, most part of the surfactant is transformed into the acid form. Further, it is possible to wash the discharged gas from the drying step 9 and the discharged gas from the thermal treatment step 35 together, and to obtain one aqueous solution which contains the fluorochemical surfactant.

It is preferable that the fluorochemical surfactant is recovered from these various aqueous solutions (A, A1', A2', A3', B and/or C). The concentrations of the fluorochemical surfactant in these aqueous solutions depend on the step in which the aqueous solution is obtained. Generally, the concentration is relatively low, for example, in the range of 0.1 to 0.3 mass % (or % by weight) or less than 0.1 mass %. The recovering treatment or the discharged water treatment is conducted in order to remove the fluorochemical surfactant from these aqueous solutions according to the below-mentioned methods.

In one treatment method, the aqueous solution containing the fluorochemical surfactant is concentrated by a multi-stage-evaporating operation such that the concentration of the fluorochemical surfactant becomes 10 mass % or more, usually in the range of 10 to 30 mass % (a evaporation method). According to this method, the solution is concentrated such that the concentration of fluorochemical surfactant is increased about 50-fold to 100-fold. However, in this method, a lot of energy is required, because the object to be separated and removed (i.e. evaporated) is water. In addition, a loss of the fluorochemical surfactant is large.

In another treatment method, the fluorochemical surfactant is adsorbed on an ion-exchange resin by contacting the aqueous solution containing the fluorochemical surfactant with the ion-exchange resin, and then separated and removed from the resin (an ion-exchange method). This treatment method has the advantage over the evaporation method in energy, but this method is not necessarily satisfactory. For example, there are problems that the ion-exchange resin crushes and the desorption of the adsorbed surfactant cannot be conducted efficiently enough. Further, there is the necessity of using another chemical substance as a liquid for desorption.

DISCLOSURE OF INVENTION

As described in the above, the fluorochamical surfactant is generally expensive and therefore preferably recovered as much as possible in view of the production cost of a fluoropolymer. Further, it is necessary to recover the fluorochemical surfactant as much as possible in order to avoid emitting the fluorochemical surfactant to the outside of the system from the viewpoint of global environment protection because the surfactant does not have biodegradability. Therefore, the object of the present invention is to provide a method for recovering a fluorochemical surfactant from an aqueous solution containing the surfactant more efficiently than the above-mentioned evaporation method or the ion-exchange method, upon recovering the fluorochemical surfactant from the aqueous solution containing the surfactant.

It has been found that the above object is achieved according to a method in which an aqueous solution containing a fluorochemical surfactant (referred to also as "a fluorochemical surfactant-containing aqueous solution") is subjected to a filtration treatment step with a reverse osmosis membrane to obtain from the aqueous solution a concentrated aqueous solution in which the concentration of the fluorochemical surfactant is increased, whereby the fluorochemical surfactant is recovered. In other words, the present invention provides a method for producing a fluoropolymer which is characterized by the above method for recovering the fluorochemical surfactant.

In the present invention, a "fluoromonomer" is not limited to a particular monomer as long as it is a monomer containing fluorine atom which is known as a polymerizable monomer used for producing a fluoropolymer. For example, tetrafluoroethylene (TFE), vinylidene fluoride (VdF), vinyl fluoride (VF), chlorotrifluoroethylene (CTFE), hexafluoropropylene (HEP), fluorovinyl ether (FVE) and so on can be mentioned.

A "fluoropolymer" is a polymer obtained by polymerizing the above fluoromonomer, and it includes, for example, PTFE (polytetrafluoroethylene), FEP (tetrafluoroethylene-hexafluoropropylene copolymer) and so on.

In the method of the present invention, "a process for producing a fluoropolymer by polymerizing fluoromonomer" is not limited to a particular process as long as it is a known process in which at least one kind of the above fluoromonomers is emulsified and polymerized in water or an aqueous medium (for example, a mixed medium containing water and an organic solvent soluble in water, such as methanol). The polymerization includes homopolymerization of a fluoromonomer and copolymerization of fluoromonomers. This process may include a pretreatment step before the polymerization step (for example a preparation of emulsifier of a predetermined concentration) and/or a post-treatment step after the polymerization process (for example a drying step, a thermal treatment step and so on). Specifically the process is the same as the process described in "Background Art" with reference to FIG. 2.

In the method of the present invention, "an aqueous solution containing a fluorochemical surfactant (a fluorochemical surfactant-containing aqueous solution)" is not limited to a particular aqueous solution as long as it is an aqueous solution which is produced in the above process for producing the fluoropolymer and contains the fluorochemical surfactant (for example, as the emulsifier). For example, this aqueous solution may be a discharged liquid resulting from coagulation, which liquid is left after an emulsified liquid containing the fluoropolymer obtained by polymerization is subjected to the coagulation treatment with water, a salt or an acid after the polymerization, followed by separating the object, i.e. the fluoropolymer; a discharged washing liquid which is produced upon washing the separated fluoropolymer; a discharged liquid resulting from dehydration which is produced upon dehydrating the separated fluoropolymer; a discharged washing liquid which is produced upon washing the fluoropolymer after dehydration; or a washing liquid which is produced upon washing a discharged gas from the drying step of the fluoropolymer and/or the thermal treatment step. Specifically, such aqueous solution may be the same as the aqueous solution described in "Background Art" (the aqueous solution A, A1', A2', A3', B and/or C). Of course, the aqueous solution may be a mixed solution in which any two or more of those solution are combined (the solution may be a solution in which all of the solutions are mixed).

The fluorochemical surfactant-containing aqueous solution may contain, in addition to the fluorochemical surfactant, a component which is inevitably immixed into the solution, such as the fluoropolymer which has not been able to be separated (especially, fluoropolymer fine particles and/or fluoropolymer fine-coagulates) regardless of the source of the solution. Further, the fluorochemical surfactant-containing aqueous solution is not limited to a particular solution as long as it contains water or an aqueous medium in addition to the fluorochemical surfactant. The aqueous medium may be a mixed solvent of water and an organic solvent that is dissolved in or dissolves water (for example, an alcohol such as methanol, ethanol or propanol, or an ester such as methyl acetate, a ketone such as acetone, an ether such as dimethylether, or the like). Furthermore, the fluorochemical surfactant-containing aqueous solution may further contain an additional component (for example, a polymerization initiator and the decomposition product thereof) as long as the component does not adversely affect the method of the present invention.

In the present invention, a "fluorochemical surfactant" is not limited to a particular one as long as it is a known surfactant which contains a fluorine atom and is used as an emulsifier in a process for producing a fluoropolymer by polymerizing the above-mentioned fluoromonomer.

The method of the present invention is particularly preferably employed when the filtration treatment with the reverse osmosis membrane is carried out as to a fluorochemical surfactant-containing aqueous solution which is resulting from a process wherein polymerization is conducted using, as an emulsifier, one or more of fluoroalkanoic acids expressed with the general formula (1): X—R—COOH wherein X is a hydrogen atom, a chlorine atom or a fluorine atom, and R is a perfluoroalkylene group having 2 to 10 carbon atoms, preferably 5 to 9 carbon atoms, and ammonium salts and sodium salts thereof (particularly sodium salts thereof). In a preferred embodiment, the emulsifier is $C_5F_{11}COONH_4$, $C_7F_{15}COONH_4$ or $C_8F_{17}COONH_4$.

In the present invention, the "filtration treatment step with the reverse osmosis membrane" is a step for filtrating the fluorochemical surfactant-containing aqueous solution, wherein a unit operation with a membrane separation is employed and a reverse osmosis membrane is used as the membrane. The filtration treatment with the reverse osmosis membrane itself is known. Generally, when providing a "fluorochemical surfactant-containing aqueous solution" on one side of the reverse osmosis membrane and applying a pressure (generally a high pressure) to the solution, a permeated liquid in which the concentration of the fluorochemical surfactant is lower than that in the solution before the filtration flows from the other side (i.e. the low pressure side)

of the membrane. This means that, when water and the fluorochemical surfactant pass through the reverse osmosis membrane, the amount of the water passing through the membrane is larger than of the fluorochemical surfactant passing through the membrane. That is, this means that water passes through the reverse osmosis membrane more preferentially (or selectively) than the fluorochemical surfactant. As a result, the concentration of the fluorochemical surfactant contained in the non-permeated liquid which flow out from this treatment step without passing through the reverse osmosis membrane, is larger than that in the fluorochemical surfactant-containing aqueous solution to be treated, and therefore, the non-permeated liquid in which the concentration of the fluorochemical surfactant is increased is obtained as a concentrate.

The reverse osmosis membrane which can be used in the method of the present invention may be a known reverse osmosis membrane. For example, a commercially available polysulfone-based membrane, polyamide-based membrane, polyimide-based membrane, or acetylcellulose-based membrane may be used alone or in any suitable combination. Such combination includes a composite membrane which is prepared by staking a plurality of membranes previously in the case where the single films are disposed in series. The form of the membrane is not limited to a particular form, and it may be, for example, a flat form, a spiral form, or a tube form.

In the present invention, "recovering the fluorochemical surfactant" means obtaining the above-mentioned aqueous solution in which the concentration of the fluorochemical surfactant is increased, i.e. the concentrate, so that the concentrate can be used for any operation which is carried out next, and does not necessarily mean obtaining the fluorochemical surfactant itself finally. Therefore, when obtaining a fluorochemical surfactant-containing aqueous solution in which the concentration of the fluorochemical surfactant is increased compared with that in the original concentration (i.e. the concentration before the filtration treatment), that is, when obtaining a concentrate, this operation corresponds to "recovering a fluorochemical surfactant." The operation carried out next may be any appropriate operation. For example, such operation includes retaining the concentrate. Specifically, in one preferred embodiment, a treatment in which the concentration of the fluorochemical surfactant in the concentrate is further increased, is carried out as the next operation. In another embodiment, the concentrate obtained by recovering the fluorochemical surfactant is reused as an emulsifier in polymerization of a fluoromonomer. To the concentrate, a new fluorochemical surfactant is added if necessary. In this case, the next operation is reusing the recovered fluorochemical surfactant as the emulsifier.

Figure 1:
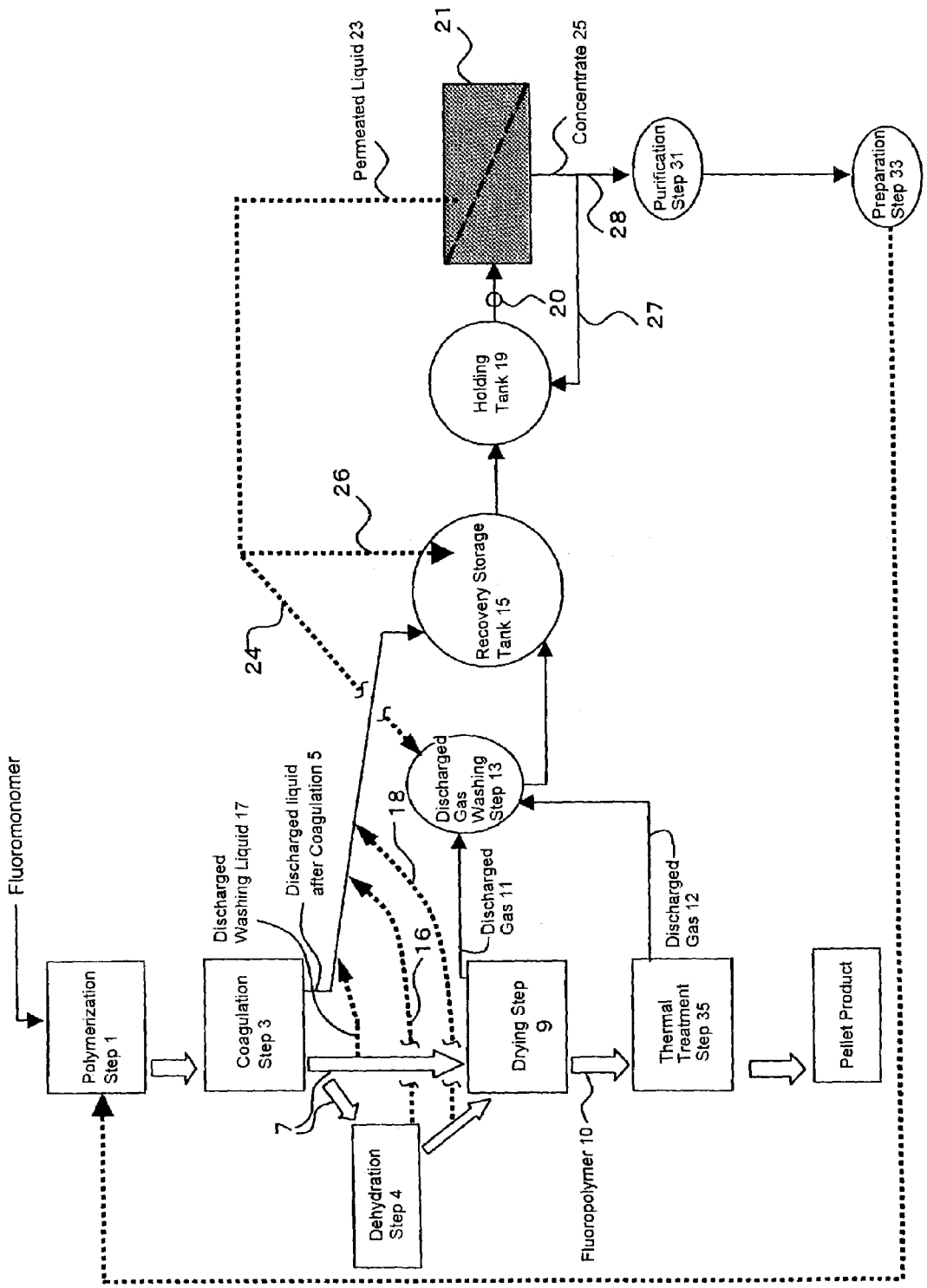
FIG. 1 shows a schematic flow-sheet which shows a process for carrying out a method of the present invention for recovering a fluorochemical surfactant from a fluorochemical surfactant-containing aqueous solution which is produced when a fluoromonomer is polymerized.
Figure 2:
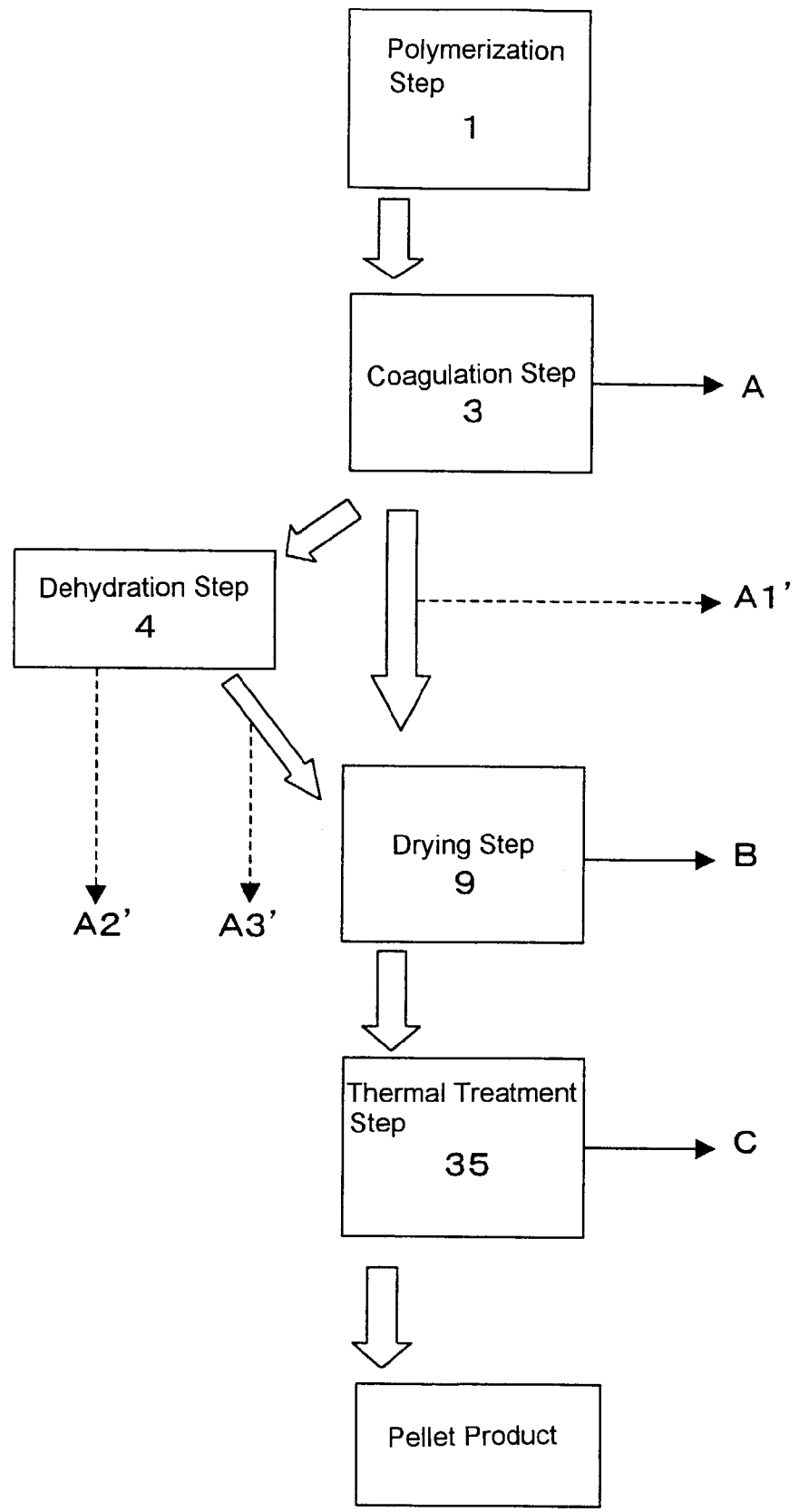
FIG. 2 shows a schematic flow-sheet which shows a process for producing a fluoropolymer.

In the figures, each reference numeral indicates the following element:

1 . . . polymerization step, 3 . . . coagulation step,
4 . . . dehydration step,
5 . . . discharged liquid after coagulation,
7 . . . fluoropolymer, 9 . . . drying step, 10 . . . fluoropolymer,
11, 12 . . . discharged gas,
13 . . . discharged gas washing step,
15 . . . recovery storage tank,
16 . . . discharged liquid resulting from dehydration,
17, 18 . . . discharged washing liquid,
19 . . . holding tank, 20 . . . pump,
21 . . . a reverse osmosis membrane module,
23 . . . permeated liquid,
24 . . . conduit tube, 25 . . . concentrate,
27, 28 . . . conduit tube, 31 . . . purification step,
33 . . . preparation step, 35 . . . thermal treatment step.

EMBODIMENT FOR CARRYING OUT THE INVENTION

Next, the present invention is described in more detail with reference to the accompanying drawings.

FIG. 1 is a flow-sheet which schematically shows a process for carrying out the method of the present invention in which, from a fluorochemical surfactant-containing aqueous solution produced in a process for producing a fluoropolymer by polymerizing a fluoromonomer, an aqueous solution in which the concentration of the fluorochemical surfactant is increased is collected as a concentrate.

In the polymerization step 1, emulsion polymerization of a fluoromonomer is carried out in water (or an aqueous medium) in the presence of the fluorochemical surfactant as an emulsifier so as to obtain microparticles of fluoropolymer. After polymerization, in the coagulation step 3, the fluoropolymer is made into a flocculated form, and then the aqueous solution 5 containing the fluorochemical surfactant (i.e. the discharged liquid after coagulation) which corresponds to the aqueous solution A, is separated from the fluoropolymer 7 by a solid-liquid separating operation.

In the drying step 9, the fluoropolymer is dried and the moisture entrained by the polymer is removed from the polymer and included in the discharged gas 11 resulting from the drying step. At this stage, also the fluorochemical surfactant accompanying the moisture is included in the discharged gas 11. This discharged gas 11 is washed with water or preferably an alkaline aqueous solution (for example, an aqueous solution of sodium hydroxide) as a washing liquid and thereby the fluorochemical surfactant and moisture (or steam) contained in the discharged gas are transferred into the washing liquid. As described below, also the permeated liquid can be used as the washing liquid. This washing liquid (corresponding to the aqueous solution B) is stored in the recovery storage tank 15. Also the discharged liquid 5 after coagulation which has been separated in the coagulation step 3 is stored in the recovery storage tank 15. Although not illustrated, the fluoropolymer 7 may be washed with water as a washing liquid between the coagulation step 3 and the drying step 9. In that case, the washing liquid as the discharged washing liquid 17 (corresponding to the aqueous solution A1') contains the fluorochemical surfactant, and also this liquid may be stored in the recovery storage tank 15. Further, in the dehydration step 4, the fluoropolymer 7 separated in the coagulation step 3 may be dehydrated, for example mechanically. The discharged liquid 16 resulting from dehydration contains the fluorochemical surfactant (and corresponds to the aqueous solution A2'). This liquid also may be stored in the recovery storage tank 15. Further, the dehydrated fluoropolymer may be washed with water or an aqueous medium as a washing liquid if necessary. In this case, a discharged washing liquid 18 which is produced by separation and removal of the fluoropolymer also is an aqueous solution containing the fluorochemical surfactant (which corresponds to the aqueous solution A3'). This also may be stored in the recovery storage tank 15. The liquid which has been stored in the recovery storage tank 15 in this manner is an aqueous solution containing the fluorochemical surfactant.

In the illustrated embodiment, the dried fluoropolymer 10 is delivered to the thermal treatment step 35 so as to be subjected to the thermal treatment, whereby a pellet product is obtained as the intended product. Since a discharged gas 12 from the thermal treatment step which is produced in this thermal treatment contains the fluorochemical surfactant, the gas is washed together with the discharged gas 11 from the drying step 9 in the discharged gas washing step 13, and thereby the fluorochemical surfactant is brought into the washing liquid (corresponding to the aqueous solution C), and delivered to the recovery storage tank 15 finally.

The discharged gas washing step 13 may be a step in which any appropriate operation is carried out as long as the operation provides a contact between the washing liquid and the discharged gas (11 and/or 12) to transfer the fluorochemical surfactant from the discharged gas to the washing liquid. For example, the operation is carried out by bubbling the discharged gas into the previously stored washing liquid. In another embodiment, the washing liquid and the discharged gas are contacted countercurrently. The washing liquid is preferably an alkaline aqueous solution, because in the case where the fluorochemical surfactant in an acid form is contained in the discharged gas, the fluorochemical surfactant is transferred into the washing liquid in a salt form with a large solubility, which is advantageous to the next filtration treatment with the reverse osmosis membrane.

Next, the fluorochemical surfactant-containing aqueous solution in the recovery storage tank 15 is supplied to the treatment step in which the reverse osmosis membrane is used. Here, the fluorochemical surfactant-containing aqueous solution is subjected to the filtration treatment with the reverse osmosis membrane to obtain an aqueous solution in which the concentration of the fluorochemical surfactant is lowered, namely, a permeated liquid, and also an aqueous solution in which the concentration of the fluorochemical surfactant is increased (therefore, a condensed solution), namely, a concentrate.

Specifically, at least part of the aqueous solution stored in the recovery storage tank 15 is transferred to another holding tank 19. Using the pump 20, the solution is supplied from this tank to the filtration treatment step 21 in which the filtration module with the reverse osmosis membrane is employed, so that the permeated liquid 23 and the concentrate 25 are obtained. In one embodiment, the concentrate 25 is returned to the holding tank 19 through the conduit tube 27, and then supplied to the treatment step 21 again. In this manner, the concentrate 25 is repeatedly supplied to the treatment step 21, that is, cyclically concentrated, and thereby the concentration of the fluorochemical surfactant in the concentrate 25 is gradually increased.

Generally, the recovering method of the present invention can be applied regardless of the concentration of the fluorochemical surfactant in the fluorochemical surfactant-containing aqueous solution. However, in one embodiment which utilizes an advantage of the filtration treatment with the reverse osmosis membrane, the initial concentration of the fluorochemical surfactant in the fluorochemical surfactant containing-aqueous solution to be treated (i.e. the concentration at the time of the first filtration treatment) is 1 mass % or less, for example, in the range of 0.1 to 0.3 mass % or less than 0.1 mass %. The initial concentration of the fluorochemical surfactant of 0.1 to 0.3 mass % or less than 0.1 mass % can be increased up to, for example 30-fold to 100-fold. Specifically, the concentrate of which concentration is increased to 5 mass % or more can be obtained.

As the reverse osmosis membrane which is employed in the method of the present invention, any appropriate membrane may be selected usually depending on the characteristic of the fluorochemical surfactant containing-solution to be treated (for example, temperature, pH, the effect of the other materials if they exist in the solution), the operation conditions of the filtration treatment with the reverse osmosis membrane (for example, the operation pressure, the operation temperature and so on), the concentration of the fluorochemical surfactant in the concentrate, the concentration of the fluorochemical surfactant in the permeated liquid and so on.

Generally, the reverse osmosis membrane which is commercially-available as an acetylcellulose-based membrane, a polyamide-based membrane, a polysulfone-based membrane, or a polyimide-based membrane is preferably used. In the present invention, as described in the above, when the fluorochemical surfactant-containing aqueous solution is repeatedly subjected to the filtration treatment with the reverse osmosis membrane, the concentration of the fluorochemical surfactant in the concentrate is gradually increased. It has been found that during the repeated treatment, the amount of the liquid which has passed through the membrane (the flux density of the permeated liquid) referred to as "flux" has a tendency to be slightly decreased, or to be substantially the same, or in some cases has a tendency to be increased. Such tendency is particularly remarkable when about 1 to 7 mass % is achieved as the concentration of the fluorochemical surfactant in the concentrate. Such tendency is not observed in a filtration treatment with a reverse osmosis membrane which is usually carried out for concentrating a particular component. Such tendency is an effect peculiar to the method of the present invention. Among others, such tendency is more remarkable when the polyamide-based membrane is used.

In the method of the present invention, the operation pressure of the filtration treatment with the reverse osmosis membrane is appropriately selected depending on the strength of the membrane to be used, the concentration of the fluorochemical surfactant in the concentrate, the concentration of the fluorochemical surfactant in the permeated liquid and so on. Generally, the operation is preferably carried out at a pressure in the range of 5 to 100 kgf/cm$^2$ (about $5\times10^5$ to $10^7$ Pa), and particularly from 10 to 50 kgf/cm$^2$ (about $10^6$ to $5\times10^6$ Pa).

In the method of the present invention, the temperature of the filtration treatment with the reverse osmosis membrane is appropriately selected depending on the durability of the membrane, the temperature of the fluorochemical surfactant-containing aqueous solution to be concentrated, the solubility of the fluorochemical surfactant into water, the concentration of the fluorochemical surfactant in the permeated liquid and so on. Taking the life of the membrane into consideration, usually the operation is preferably carried out at a temperature of 90° C. or less, particularly 50° C. or less and generally above room temperature (about 20° C.).

It is preferable that, at the time of supplying the fluorochemical surfactant-containing aqueous solution to the filtration module with the reverse osmosis membrane, the solution does not present excessively strong basicity or strong acidity in order that the life of the membrane is not excessively shortened. Some kinds of the membranes may limit the feasible pH range of the solution. The pH of the fluorochemical surfactant-containing aqueous solution is controlled generally in the range of about 2 to 11, preferably in the range of about 5 to 11, and more preferably in the range of 7 to 9, upon providing the solution to the filtration module.

As a result of the concentration with the reverse osmosis membrane, the fluorochemical surfactant is precipitated in water, when the concentration of the fluorochemical surfactant becomes high such that the concentration exceeds the solubility. In one preferable embodiment, it has been found that in order to prevent such precipitation, it is advantageous that when the fluorochemical surfactant is in an acid form, an alkaline such as sodium hydroxide is added to the fluorochemical surfactant-containing aqueous solution to be treated so as to transform the surfactant into a salt form because the solubility of the fluorochemical surfactant into water becomes increased. For example, it is preferable that the surfactant is transformed into a sodium salt (such as $C_7F_{15}COONa$) or an ammonium salt (such as $C_7F_{15}COONH_4$).

Specifically, when transforming into a sodium salt (for example, $C_7F_{15}COONa$), it is preferable to add an aqueous solution of sodium hydroxide so that the pH of the fluorochemical surfactant-containing aqueous solution upon providing the solution to the filtration module is in the range of about 7 to 11, and preferably in the range of about 8 to 9. In this case, the saturated concentration of the fluorochemical surfactant in the concentrate becomes about 12 mass % (at 20° C.). When transforming into an ammonium salt (for example, $C_7F_{15}COONH_4$), it is preferable to add ammonia water so that the pH of the fluorochemical surfactant-containing aqueous solution upon providing the solution to the filtration module is in the range of about 5 to 9, and preferably in the range of about 5 to 6. In this case, the saturated concentration of the fluorochemical surfactant in the concentrate becomes about 30 mass % (at 20° C.). When the permeated liquid 23 is alkaline and contains sodium hydroxide or ammonium hydroxide, the pH can be adjusted by returning the permeated liquid 23 to the recovery storage tank 15 via the conduit tube 26.

As mentioned in the above, in the method of the present invention, the amount of the permeated liquid (FLUX value; $L/m^2 \cdot hr$) is maintained at a generally constant value with little tendency of decreasing. Generally, in a filtration treatment with a reverse osmosis membrane, the amount of the permeated liquid decreases due to the effect of concentration polarization which arises with the progress of the concentration. Therefore, it is very specific that the decrease in the amount of the permeated liquid is very small during the filtration treatment of the fluorochemical surfactant-containing solution with the reverse osmosis membrane. This is a tendency peculiar to the case where the aqueous solution containing a specific surfactant, i.e. the fluorochemical surfactant is treated. Therefore, the use of the reverse osmosis membrane for recovering a fluorochemical surfactant from a fluorochemical surfactant-containing aqueous solution is very advantageous commercially.

It has been found that a metal ion contained in the aqueous solution to be treated forms a salt with the fluorochemical surfactant which salt is hardly soluble into water and that the salt may adversely affect the filtration treatment with the reverse osmosis membrane. With the fluorochemical surfactant which is recovered according to the method of the present invention, particularly, calcium, potassium, and iron easily forms a salt which is hardly soluble into water. Therefore, it is preferable that the aqueous solution to be treated contains these metal ions in a minute amount, for example, each metal ion at 10 ppm by weight or less. Therefore, it is preferable that water which is used in the process for producing the fluoropolymer, for example, water used as a medium for the polymerization of a fluoromonomer and water used for washing the discharged gas contain such a minute amount of metal ion. Thus, it is desirable to use, as the water used in the fluoropolymer production process, water from which such metal ion is removed such that the concentration of the metal ion becomes 10 ppm or less, for example, deionized water.

As described in the above, a part of the fluorochemical surfactant which has been used for polymerization accompanies the polymer and is exhausted with the discharged gas in the polymer drying step 9 and the following thermal treatment step 35. The discharged gas is collected as the fluorochemical surfactant-containing aqueous by being washed with the washing liquid in the washing step 13. When the fluorochemical surfactant is in a form of acid, the surfactant is preferably recovered in a form of salt in order to prevent the fluorochemical surfactant from precipitating due to the relative increase in the concentration of the fluorochemical surfactant as a result of the concentration. Specifically, in the same manner as in the above-described transformation into the salt as to the aqueous solution of the fluorochemical surfactant, for example, an aqueous solution of an alkali (such as sodium hydroxide) is preferably used as the washing liquid to recover the fluorochemical surfactant in a form of salt whose solubility is larger, whereby the operationality of the washing step is improved. When the permeated liquid 23 is alkaline and contains sodium hydroxide or ammonium hydroxide, the fluorochemical surfactant in an acid form can be transformed into a salt form by returning the permeated liquid 23 to the discharged gas washing step 13 via the conduit tube 24.

In this manner, preventing the precipitation of the fluorochemical surfactant by transforming its acid form into salt that has a larger solubility in water, can be applied to any adequate step in which the precipitation is not desirable (for example, the discharged gas washing step, the filtration treatment with the reverse osmosis membrane and so on). Oppositely, the fluorochemical surfactant is precipitated by transforming the form of the fluorochemical surfactant from salt to acid that solubility is less in water, which results a precipitate with a high purity. Such precipitation may be employed in any adequate step in which such precipitation is desirable (for example, the bellow-mentioned purification step).

When the fluorochemical surfactant-containing aqueous solution contains a substance which will adversely affects the filtration with the reverse osmosis membrane, for example, fine fluoropolymer particles which will attach the surface of the reverse osmosis membrane to impede the filtration, it is preferable that a pretreatment for previously removing such substance is carried out before the filtration with the reverse osmosis membrane. For example, when the discharged liquid after coagulation or the discharged washing liquid contains such fine particles in a little amount, it is effect to flocculate the fine polymer particles by adding a coagulant (such as PAC (poly aluminum chloride)) if necessary, followed by removing the coagulate with a prefilter, an ultrafilter membrane, or a precise filtration membrane before the filtration treatment with the reverse osmosis membrane.

The concentration of the fluorochemical surfactant in the permeated liquid which is obtained by the filtration treatment with the reverse osmosis membrane varies depending on the separability of the material employed for the membrane. Generally, when using the polyimide-based membrane, it is possible to obtain the concentration of 60 ppm by mass (or by weight) or less, preferably 30 ppm by mass or less, and more preferably 10 ppm by mass or less. When using the polyamide-based membrane, it is possible to obtain the concentration of 40 ppm by mass or less, preferably 20 ppm by mass or less, and more preferably 10 ppm by mass or less. When using the polysulfone-based membrane, it is possible to obtain the concentration of 40 ppm by mass or less, preferably 20 ppm by mass or less, and more preferably 10 ppm by mass or less.

The permeated liquid which is an aqueous solution containing the fluorochemical surfactant in such minute amount (and is alkaline in some cases), does not contain a component which adversely affects the filtration treatment with the reverse osmosis membrane. Therefore, in the method of the present invention, the permeated liquid which is obtained by the filtration treatment can be used as water which gives a fluorochemical surfactant-containing aqueous solution.

For example, as the washing liquid which is used in the washing gas washing step 13 for washing the discharged gas from the fluoropolymer drying step 9, the permeated liquid can be supplied through the conduit 24 after adding, for example, sodium hydroxide to the liquid if necessary. In one embodiment, when the permeated liquid is an alkaline aqueous solution, this liquid is mixed into the discharged liquid after coagulation and/or the discharged washing liquid containing the fluorochemical surfactant in an acid form so as to transform the surfactant into a salt form or to adjust the pH of the liquid. In another embodiment, the permeated liquid can be added into the recovery storage tank 15 for the same purpose. In this manner, the permeated liquid can be used in various steps. Therefore, by recycling the permeated liquid to these steps, the method for recovering the fluorochemical surfactant (or the method for producing the fluoropolymer) of the present invention can be made into a closed system as to the permeated liquid.

The above-described method for recovering the fluorochemical surfactant of the present invention can be employed in order to concentrate the fluorochemical surfactant-containing aqueous solution instead of the conventional evaporation method or ion-exchange method, or in order to further concentrate the concentrated fluorochemical surfactant-containing aqueous solution which is obtained by such conventional method. Alternatively, the concentrated fluorochemical surfactant-containing aqueous solution which is obtained by the method of the present invention can be further concentrated by the conventional method.

In another embodiment, an adsorption treatment with activated carbon may be combined with the method of the present invention. Specifically, in one embodiment, the fluorochemical surfactant-containing aqueous solution may be subjected to the adsorption treatment with activated carbon so as to remove a certain amount of the fluorochemical surfactant from the aqueous solution, and thereafter the remaining fluorochemical surfactant can be recovered from the aqueous solution by the method of the present invention. In another embodiment, after recovering the fluorochemical surfactant from the aqueous solution by the method of the present invention, the fluorochemical surfactant remaining in the permeated liquid may be reduced by the adsorption with activated carbon. Particularly, when the permeated liquid is discarded outside the system, it is effective that the discard is conducted after subjecting the liquid to the adsorption treatment with activated carbon.

In one embodiment of the method of the present invention, the concentrate obtained by the filtration treatment with the reverse osmosis membrane is subjected to a purification treatment step so as to obtain the fluorochemical surfactant with a high purity. For example, when an acid (for example sulfuric acid) is added to the concentrate which contains the fluorochemical surfactant in a salt form and in which the concentration of the surfactant is increased to 10 mass % by the filtration treatment, the salt is transformed into its acid form whose solubility in water is low, whereby the fluorochemical surfactant is precipitated in water and then recovered. As a result, the precipitate of high purity which contains the fluorochemical surfactant in an amount of 85 mass % (the rest is substantially water) can be obtained. The precipitate is distilled by heating (preferably under a reduced pressure) to evaporate and remove the water firstly, and further heated to obtain the fluorochemical surfactant in an acid form as a distillate, whereby the fluorochemical surfactant with a purity of 99% or more can be recovered. In this manner, the concentrate may be subjected to the purification step 31 which consists of adding an acid (for example, adding sulfuric acid), separating a precipitate, and distilling the precipitate by heating.

The fluorochemical surfactant recovered in this manner may be used for any appropriate application, just as it is or after an additional treatment. For example, as showed in the drawings, after the preparation step 33 in which the fluorochemical surfactant is transformed into a form of ammonium salt with ammonia water, the surfactant is supplied to the polymerization step 1 to be used as the emulsifier again in the polymerization of a fluoromonomer.

The filtration treatment step in the recovering method of the present invention may be carried out by using a holding tank 19, a high-pressure pump 20 and a filtration module with a reverse osmosis membrane 21, as shown in FIG. 1. The fluorochemical surfactant-containing aqueous solution is supplied from the recovery storage tank 15 to the holding tank 19, and supplied from the holding tank 19 to the reverse osmosis module 21 by means of the high-pressure pump 20 (such as a plunger pump and a diaphragm pump). The concentrate 25 is delivered to the next purification step 31 via the conduit tube 28, or recycled to the holding tank 19 via the conduit tube 27 if the concentrate needs to be further concentrated. The permeated liquid 23 from the reverse osmosis membrane can be recycled by being passed through the conduit tube 24 and then being used as a washing water in the washing step 13 for washing the gas from the drying step 9 or the thermal treatment step 35, or by being passed via the conduit tube 26, and then being mixed with the discharged liquid after coagulation 5, the discharged liquid resulting from dehydration 16, and/or the discharged washing liquid (17 and/or 18) in the recovery storage tank 15 so as to adjust the pH, whereby the closed loop is formed.

In the recovering method of the present invention, the filtration treatment may be operated in a batch process or a continuous process. When operating in a batch process, only the permeated liquid 23 is reused in the upper-stream step than the filtration step (for example, the discharged gas washing step 13, the recovery storage tank 15 and so on), the concentrate 25 is recycled to the holding tank 19 so as to repeat the concentration until the concentration of the fluorochemical surfactant in the concentrate reaches a predetermined level. Also when operating in a continuous process, operation is carried out, recycling part or most of the concentrate to the holding tank 19 depending on the desired concentration rate.

As mentioned in the above, the specific tendency is found in the filtration treatment of the fluorochemical-containing aqueous solution with the reverse osmosis membrane. Therefore, according to the tendency, the present invention provides a method in which an aqueous solution containing the fluorine compound (or fluorine-containing compound) expressed with the above general formula (1) which may be the above mentioned fluorochemical surfactant and includes an acid and an ammonium salt (such as ammonium salt and sodium salt), (which solution is referred to as a "fluorine compound-containing aqueous solution) is subjected to the filtration treatment with the reverse osmosis membrane, and thereby the fluorine compound-containing aqueous solution in which the concentration of the compound is higher than that in the solution before the filtration, that is, a method for obtaining a concentrated fluorine compound-containing aqueous solution. The various above descriptions with respect to the recovering method of the present invention except for the description as to the production of fluoropolymer are applicable to the method of the present invention for obtaining the concentrated fluorine compound-containing aqueous solution.

In this method, the fluorine compound-containing aqueous solution may be produced in the production process for producing a fluoropolymer, or may be produced in other any source (for example, in the process for producing the fluorochemical surfactant itself). That is, the source of the fluorine compound-containing aqueous solution is not limited at all.

The fluorine compound is not limited to a particular compound as long as it is the compound expressed with the general formula (1) (which may be the above-mentioned fluorochemical surfactant and includes an acid and a salt (such as ammonium salt and sodium salt). It does not matter that the fluorine compound is used or not in the emulsion polymerization of the fluoropolymer production process. In this method, the particularly preferable reverse osmosis membrane is a polyamide-base membrane, polysulfone-based membrane, or a polyimide-based membrane, and more particularly preferable one is a polyamide-based membrane or a polysulfone-based membrane. This method is useful to the fluorine-containing compound of the general formula (1) wherein R has 5 to 9 carbon atoms, particularly 7 carbon atoms, and particularly useful to the sodium salt or ammonium salt of such compound. When the fluorine compound is contained in water in an acid form, it is preferable that the filtration treatment is carried out after transforming the compound into a sodium salt form.

EXAMPLES

The present invention is more specifically described in the following examples.

Example 1

A filtration treatment with a reverse osmosis membrane was carried out using as a feed liquid a fluorochemical surfactant-containing aqueous solution ($C_7F_{15}COONa$ concentration: 0.2 mass %) which was collected from the step for washing the discharged gas from the drying step in the process for producing fluoropolymer by emulsifying and polymerizing TFE as a fluoromonomer. This solution corresponds to the above-mentioned aqueous solution B. In the filtration treatment with the reverse osmosis membrane, a filtration module with a polyamide membrane (manufactured by FILMTEC Corp., trade name: TW) was used, and the operation temperature was in the range of 25 to 35° C. and the operation pressure was 30 $kgf/cm^2$ during the filtration treatment. The pH of the aqueous solution fed to the filtration module was in the range of 8 to 9 during the filtration operation. By carrying out the cyclic concentration operation whose concentration rate is thirty-five, the aqueous solution in which the concentration of the fluorochemical surfactant was 7 mass %, was obtained as a concentrate. During the filtration treatment, the amount of permeated liquid (Flux) was not substantially decreased and was stable in the range of 70 to 80 ($l(liter)/m^2 \cdot hr$).

The fluorochemical surfactant was precipitated in a form of acid by adding sulfuric acid to the obtained concentrate, and then collected. The precipitate was heated to remove water, and then the substantially pure $C_7F_{15}COOH$ was recovered by the vacuum distillation operation. Further, by adding ammonia water, an aqueous solution of $C_7F_{15}COONH_4$ in which the concentration was adjusted to 10 mass % was obtained. This aqueous solution was able to reuse in an emulsion polymerization step without arising problems.

The pH of the permeated liquid which has passed through the reverse osmosis membrane which was measured during the filtration treatment operation was in the range of 8 to 10. Further, the concentration of the fluorochemical surfactant in the permeated liquid was 10 ppm by mass or less. This alkaline discharged liquid which permeated through the membrane and contained the fluorochemical surfactant in a minute amount was able to be reused as a washing liquid used in the step for washing the discharged gas from the polymer drying process, and was able to reused for adjusting the pH of the liquid in the recovery storage tank in which the discharged liquid after coagulation and the discharged washing liquid from the fluoropolymer washing step were stored.

Example 2

The filtration treatment of the fluorochemical surfactant-containing aqueous solution was carried out in the same manner as Example 1 except that a polysulfone membrane (manufactured by FILMTEC Corp., trade name: FT-30) was used as the reverse osmosis membrane. By carrying out the cyclic concentration operation whose concentration rate was fifty, the aqueous solution in which the concentration of the fluorochemical surfactant was 10 mass %, was obtained. During the filtration treatment, the pH of the aqueous solution fed to the filtration module was in the range of 8 to 9. During the filtration treatment, the amount of the permeated liquid was in the range of 80 to 60 ($l(liter)/m^2 \cdot hr$) and shows a good result with a tendency of gradual and slight decreasing. The pH of the permeated liquid which was measured during the filtration treatment operation was in the range of 8 to 10. The concentration of the fluorochemical surfactant in the permeated liquid which has passed through the membrane was 10 ppm by mass or less.

Example 3

The filtration treatment with a polyimide membrane (manufactured by Desalination Systems, Inc., trade name: SG) as the reverse osmosis membrane was carried out using as a feed liquid a fluorochemical surfactant-containing aqueous solution ($C_7F_{15}COONH_4$ concentration: 0.2 mass %) whose pH was 6. By carrying out the cyclic concentration operation whose concentration rate was thirty-five, the aqueous solution in which the concentration of the fluorochemical surfactant was 7 mass %, was obtained. During the filtration treatment, the pH of the aqueous solution fed to the filtration module was in the range of 6 to 8. During the filtration treatment, the amount of the permeated liquid was in the range of 50 to 30 (l(liter)/m$^2$·hr) and shows a good result with a tendency of gradual and slight decreasing. The pH of the permeated liquid which was measured during the filtration treatment operation was in the range of 6 to 8. The concentration of the fluorochemical surfactant in the permeated liquid which has passed through the membrane was 30 ppm by mass or less.

The above-described present invention includes the following embodiments:

The first embodiment: A method for recovering a fluorochemical surfactant which comprises subjecting, to a filtration treatment step with a reverse osmosis membrane, an aqueous solution containing the fluorochemical surfactant which solution is resulting from a process for producing a fluoropolymer by polymerizing a fluoromonomer, whereby a concentrated aqueous solution in which the concentration of fluorochemical surfactant is increased is obtained from said aqueous solution.

The second embodiment: The method according to the first embodiment, wherein the fluorochemical surfactant is at least one compound selected from:

a fluoroalkanoic acid expressed with the general formula: X—R—COOH wherein X is a hydrogen atom, a chlorine atom or a fluorine atom, and R is a perfluoroalkylene group having 2 to 10 carbon atoms; and an ammonium salt and a sodium salt of the fluoroalkanoic acid.

The third embodiment: The method according to the second embodiment, wherein R is a perfluoroalkylene group having 5 to 9 carbon atoms.

The fourth embodiment: The method according to any one of the first to the third embodiments, wherein $C_7F_{15}COONH_4$ is used as an emulsifier in the process for producing the fluoropolymer by polymerizing the fluoromonomer.

The fifth embodiment: The method according to any one of the first to the fourth embodiments, wherein at least part of the fluorochemical surfactant contained in the aqueous solution that is to be subjected to the filtration treatment step with the reverse osmosis membrane is in an acid form, and the filtration treatment step is carried out after the fluorochemical surfactant in the acid form is transformed into a sodium salt or an ammonium salt form.

The sixth embodiment: The method according to any one of the first to the fifth embodiments, wherein the reverse osmosis membrane is single membrane selected from a polyamide-based membrane, polysulfone-based membrane, and polyimide-based membrane, or a composite membrane of those membrane.

The seventh embodiment: The method according to any one of the first to the sixth embodiments, wherein the aqueous solution containing the fluorochemical surfactant is a discharged liquid after coagulation, a discharged liquid resulting from dehydration, a discharged washing liquid and/or a washing liquid resulting from washing of discharged gas, each liquid being produced in the process for producing the fluoropolymer.

The eighth embodiment: The method according to any one of the first to the seventh embodiments, which further comprises separating the fluorochemical surfactant from the obtained concentrated aqueous solution containing the fluorochemical surfactant, and reusing the fluorochemical surfactant.

The ninth embodiment: The method according to the eighth embodiment, wherein the separated fluorochemical surfactant is reused as an emulsifier for producing a fluoropolymer.

The tenth embodiment: The method according to any one of the first to the ninth embodiments, wherein a permeated liquid which is produced by the filtration treatment with the reverse osmosis membrane, is used as the washing liquid for washing a discharged gas that results from the production of the fluoropolymer and contains the fluorochemical surfactant.

The eleventh embodiment: A method for producing a fluoropolymer which is characterized by the method for recovering the fluorochemical surfactant according to any one of the first to the tenth embodiments.

The twelfth embodiment: The method for producing the fluoropolymer according to the eleventh embodiment, wherein a fluoromonomer is at least one selected from tetrafluoroethylene, vinylidene fluoride, vinyl fluoride, chlorotrifluoroethylene, hexafluoropropylene, and fluorovinyl ether.

The thirteenth embodiment: A method for obtaining a concentrated aqueous solution in which the concentration of the fluorine compound is increased, which comprises subjecting, to a filtration treatment with a reverse osmosis membrane, an aqueous solution containing at least one fluorine compound selected from a fluoroalkanoic acid expressed with the general formula: X—R—COOH [wherein X is a hydrogen atom, a chlorine atom or a fluorine atom, and R is a perfluoroalkylene group having 2 to 10 carbon atoms], and an ammonium salt and a sodium salt thereof, whereby a concentrated aqueous solution in which the concentration of fluorochemical surfactant is increased is obtained from said aqueous solution.

The fourteenth embodiment: The method for obtaining the concentrated aqueous solution in which the concentration of fluorochemical surfactant is increased according to the thirteenth embodiment, wherein R is a perfluoroalkylene group having 5 to 9 carbon atoms.

The fifteenth embodiment: The method for obtaining the concentrated aqueous solution in which the concentration of fluorochemical surfactant is increased according to the thirteenth or the fourteenth embodiment, wherein when the fluorine compound is contained in an acid form in the aqueous solution, the filtration treatment is carried out after the surfactant is transformed into a sodium salt form or an ammonium salt form.

The sixteenth embodiment: The method for obtaining the concentrated aqueous solution in which the concentration of fluorochemical surfactant is increased according to any one of the thirteenth to the fifteenth embodiments, wherein the reverse osmosis membrane is single membrane selected from a polyamide-based membrane, polysulfone-based membrane, and polyimide-based membrane, or a composite membrane of those membrane.

It should be noted that the present application claims a priority under the Paris Convention to Japanese Patent Applications No. 2000-244369 filed on Aug. 11, 2000, entitled "Method for Recovering Fluorochemical Surfactant." The contents of this application are incorporated herein by the reference thereto in their entirety.

What is claimed is:

1. A method for recovering a fluorochemical surfactant which comprises subjecting, to a filtration treatment step with a reverse osmosis membrane, an aqueous solution containing the fluorochemical surfactant wherein the aqueous solution results from a process for producing a fluoropolymer by polymerizing a fluoromonomer, whereby a concentrated aqueous solution, in which the concentration of fluorochemcial surfactant is increased, is obtained from said aqueous solution.

2. The method according to claim 1, wherein the fluorochemical surfactant is at least one compound selected from: a fluoroalkanoic acid expressed with the general formula: X—R—COOH wherein X is a hydrogen atom, a chlorine atom or a fluorine atom, and R is a perfluoroalkylene group having 2 to 10 carbon atoms; and an ammonium salt and a sodium salt of the fluoroalkanoic acid.

3. The method according to claim 2, wherein R is a perfluoroalkylene group having 5 to 9 carbon atoms.

4. The method according to claim 1, wherein $C_7F_{15}COONH_4$ is used as an emulsifier in the process for producing the fluoropolymer by polymerizing the fluoromonomer.

5. The method according to claim 1, wherein at least part of the fluorochemical surfactant contained in the aqueous solution that is to be subjected to the filtration treatment step with the reverse osmosis membrane is in an acid form, and the filtration treatment step is carried out after the fluorochemical surfactant in the acid form is transformed into a sodium salt or an ammonium salt form.

6. The method according to claim 1, wherein the reverse osmosis membrane is single membrane selected from a polyamide-based membrane, polysulfone-based membrane, and polyimide-based membrane, or a composite membrane of those membranes.

7. The method according to claim 1, wherein the aqueous solution containing the fluorochemical surfactant is a discharged liquid after coagulation, a discharged liquid resulting from dehydration, a discharged washing liquid and/or a washing liquid resulting from washing of discharged gas, each liquid being produced in the process for producing the fluoropolymer.

8. The method according to claim 1, which further comprises separating the fluorochemical surfactant from the obtained concentrated aqueous solution containing the fluorochemical surfactant, and reusing the fluorochemical surfactant.

9. The method according to claim 8, wherein the separated fluorochemical surfactant is reused as an emulsifier for producing a fluoropolymer.

10. The method according to claim 1, wherein a permeated liquid which is produced by the filtration treatment with the reverse osmosis membrane, is used as the washing liquid for washing a discharged gas that results from the production of the fluoropolymer and contains the fluorochemical surfactant.

11. A method for producing a fluoropolymer which is characterized by the method for recovering the fluorochemical surfactant according to any one of claims 1 to 10.

12. The method for producing the fluoropolymer according to claim 11, wherein a fluoromonomer is at least one selected from tetrafluoroethylene, vinylidene fluoride, vinyl fluoride, chlorotrifluoroethylene, hexafluoropropylene, and fluorovinyl ether.

13. A method for obtaining a concentrated aqueous solution in which the concentration of a fluorine compound is increased, which comprises subjecting, to a filtration treatment with a reverse osmosis membrane, an aqueous solution containing a surfactant comprising at least one fluorine compound selected from a fluoroalkanoic acid expressed with the general formula:

X—R—COOH wherein X is a hydrogen atom, a chlorine atom or a fluorine atom, and R is a perfluoroalkylene group having 2 to 10 carbon atoms, and an ammonium salt and a sodium salt thereof, whereby a concentrated aqueous solution, in which the concentration of fluorochemical surfactant is increased, is obtained from said aqueous solution.

14. The method according to claim 13, wherein R is a perfluoroalkylene group having 5 to 9 carbon atoms.

15. The method according to claim 13, wherein when the fluorine compound is contained in an acid form in the aqueous solution, the filtration treatment is carried out after the surfactant is transformed into a sodium salt form or an ammonium salt form.

16. The method according to claim 13, wherein the reverse osmosis membrane is single membrane selected from a polyamide-based membrane, polysulfone-based membrane, and polyimide-based membrane, or a composite membrane of those membranes.

* * * * *